United States Patent
Christoph et al.

(10) Patent No.: US 6,651,351 B1
(45) Date of Patent: Nov. 25, 2003

(54) COORDINATE MEASURING INSTRUMENT WITH FEELER ELEMENT AND OPTIC SENSOR FOR MEASURING THE POSITION OF THE FEELER

(75) Inventors: Ralf Christoph, Schöffengrund (DE); Eugen Trapet, Bortfeld (DE); Heinrich Schwenke, Braunschweig (DE)

(73) Assignee: Werth Messtechnik GmbH, Giessen (DE)

(*) Notice: Subject to any disclaimer, the term of this patent is extended or adjusted under 35 U.S.C. 154(b) by 0 days.

(21) Appl. No.: 09/445,430

(22) PCT Filed: Jun. 10, 1998

(86) PCT No.: PCT/EP98/03526

§ 371 (c)(1), (2), (4) Date: Mar. 8, 2000

(87) PCT Pub. No.: WO98/57121

PCT Pub. Date: Dec. 17, 1998

(30) Foreign Application Priority Data

Jun. 12, 1997 (DE) .......................... 297 10 242
Oct. 6, 1997 (DE) .......................... 197 43 969
Feb. 13, 1998 (DE) .......................... 198 05 892

(51) Int. Cl.$^7$ .............................................. G01B 5/004
(52) U.S. Cl. .............................. 33/503; 33/556; 33/559
(58) Field of Search .................... 33/556, 557, 558, 33/559, 560, 561, 503

(56) References Cited

U.S. PATENT DOCUMENTS

| | | | | |
|---|---|---|---|---|
| 3,180,030 A | * | 4/1965 | WItzke ..................... | 33/556 |
| 4,972,597 A |   | 11/1990 | Kadosaki et al. | |
| 5,103,572 A | * | 4/1992 | Ricklefs ................... | 33/558 |
| 5,125,165 A | * | 6/1992 | Gerhard .................... | 33/556 |
| 5,251,156 A | * | 10/1993 | Heier et al. ................ | 33/559 |
| 5,615,489 A | * | 4/1997 | Breyer et al. ............... | 33/556 |
| 5,712,961 A |   | 1/1998 | Matsuo ..................... | 33/559 |
| 5,724,745 A | * | 3/1998 | Brenner et al. ............. | 33/561 |
| 5,806,201 A | * | 9/1998 | Feichtinger ................ | 33/561 |
| 5,825,666 A |   | 10/1998 | Freifeld | |
| 5,917,181 A | * | 6/1999 | Yoshizumi et al. ........... | 33/561 |
| 6,021,579 A | * | 2/2000 | Schimmels et al. .......... | 33/503 |
| 6,240,651 B1 | * | 6/2001 | Schroeder et al. ........... | 33/559 |
| 6,307,084 B1 | * | 10/2001 | Matsuki et al. .............. | 33/561 |

FOREIGN PATENT DOCUMENTS

| | | |
|---|---|---|
| DE | 2605772 | 8/1977 |
| DE | 3502388 | 9/1985 |
| DE | 3629689 | 3/1987 |
| DE | 4002043 | 7/1991 |
| DE | 4327250 | 3/1994 |
| DE | 4312579 | 10/1994 |

OTHER PUBLICATIONS

William R. Gilman, "Redefining Coordinate Metrology"—QUALITY, Apr. 1988, pp. 20–24.
William R. Gilman, "Multisensor Metrology Adds Power to Vision Systems"—AMERICAN MACHINIST, Apr. 1994, pp. 29–32.
"A Fresh Look at Optical Gaging"—Tooling & Production, Oct. 1990, pp. 76–78.
"Gaging Developements"—QUALITY, Jan. 1990.
"Plastics World", Aug. 1989, pp. 4–5.
Carl Zeiss Jena, "Technische Feinmessgerate", 1962, pp. 54–55.

* cited by examiner

*Primary Examiner*—Diego Gutierrez
*Assistant Examiner*—Madeline Gonzalez
(74) *Attorney, Agent, or Firm*—Dennison, Schultz & Dougherty

(57) ABSTRACT

A method for measuring structures of an object using a feeler element associated with a coordinate measuring instrument and extending from an elastic bendable feeler extension is disclosed, and wherein the feeler element is brought into contact with an object having structures to be measured and the position of the feeler is then determined by comparing the position of the feeler as determined by the coordinate measuring instrument with the position determined by the optical sensor.

33 Claims, 7 Drawing Sheets

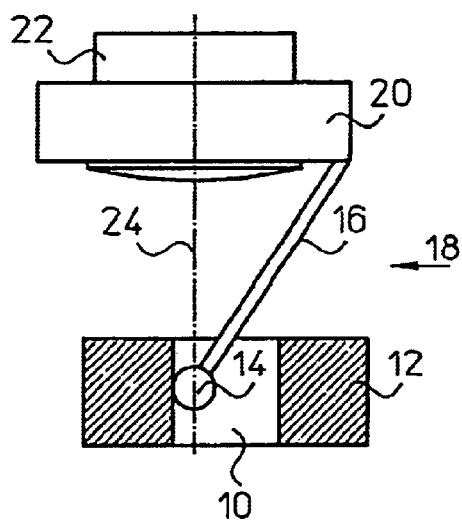
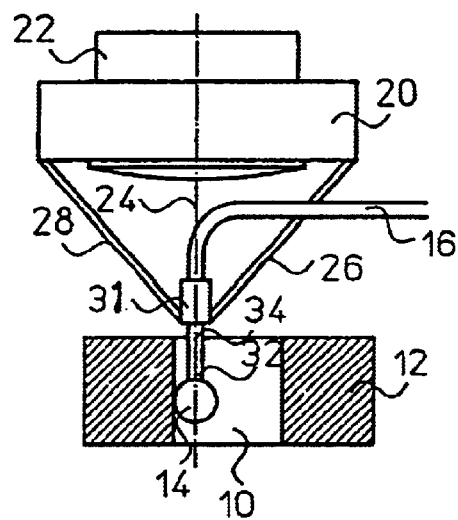

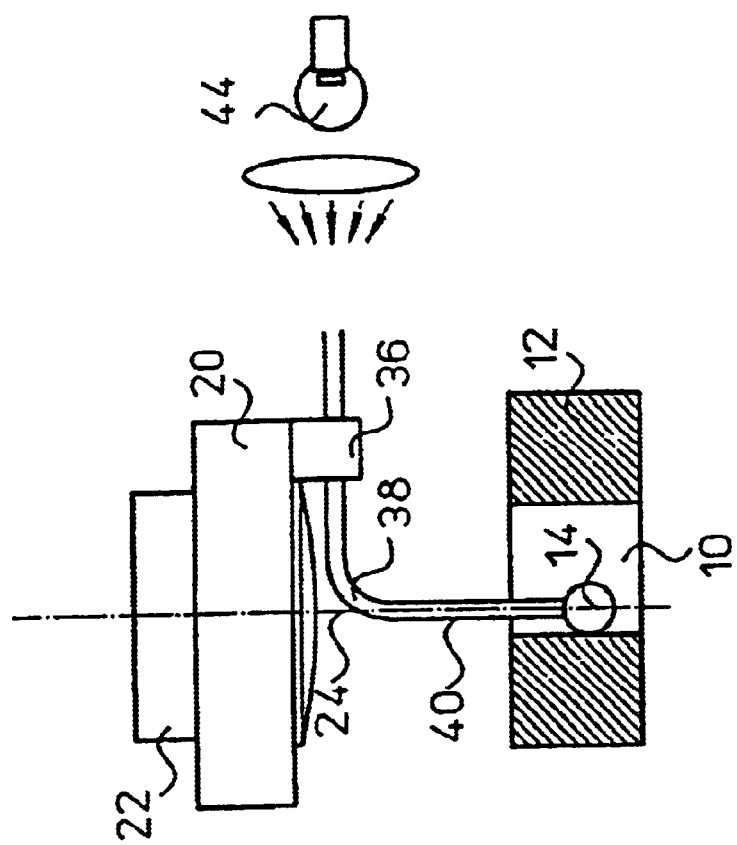
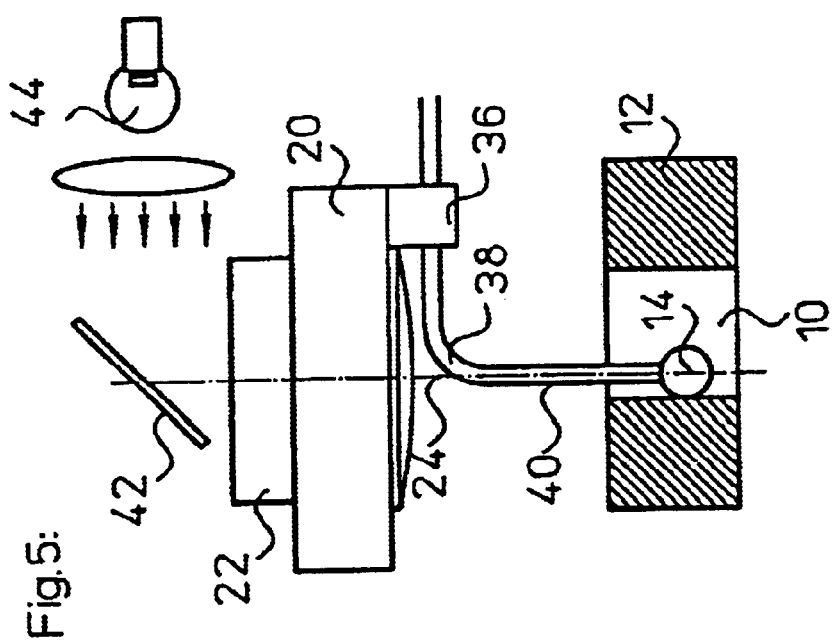

COORDINATE MEASURING INSTRUMENT WITH FEELER ELEMENT AND OPTIC SENSOR FOR MEASURING THE POSITION OF THE FEELER

CROSS-REFERENCE TO RELATED APPLICATIONS:

Not Applicable

BACKGROUND OF THE INVENTION

1. Technical Field of the Invention

The invention relates to a method for measurement of an object by means of a feeler element used with a coordinate measuring instrument and extending from a feeler extension, where the feeler element is brought into contact with the object and its position is then determined. The invention further relates to a coordinate measuring instrument for measurement of structures of an object by means of a feeler used with a coordinate measuring instrument and comprising a feeler element and a feeler extension, a sensor for optical determination of the feeler element and/or at least one target directly assigned thereto, and an evaluation unit using, wherein the structures can be calculated from the position of the optical system relative to the coordinate system of the coordinate measuring instrument and from the position of the feeler element and/or of the target measured directly using the optical system.

2. Description of Related Art

For measurement of the structures of an object, coordinate measuring instruments with electromechanically operating feelers are used with which the structure position is determined indirectly, i.e. the position of the sensing element (ball) is transmitted via a feeler pin. The attendant deformations of the feeler pin in conjunction with the active friction forces lead to a falsification of the measurement results. Because of the strong force transmission, measurement forces also result that are typically in excess of 10 N. The geometric design of such feeler systems limits these to ball diameters greater than 0.3 mm.

The three-dimensional measurement of small structures in the range of a few tenths of a millimeter and the sensing of easily deformed test specimens is therefore problematic, if not impossible. As a result of the not completely known error influences due to deformation by the feeler pin and feeler element, and the unknown sensing forces due to stick-slip effects for example, measurement uncertainties occur that are typically in excess of 1 $\mu$m.

It is known from WO 93/07443 to indirectly determine the structure of an object by means of optical sensors, where a rigid feeler has at least three targets, which are measured for determination of a coordination measurement point using an angle sensor.

Another possibility for optical measurement of the structures of a body is described in WO 88/07656 by an interferomter system. This system comprises a feeler with a rod-like feeler extension at the end of which a ball is arranged that is brought into contact with the body whose position is to be determined. The feeler extension extends from a plate-like holder that is adjustable in three dimensions relative to the object. Retroreflectors extend from the holders and are subjected to beams emitted by interferometers. The reflected beams are then measured by the interferometers in order to permit measurement of the optical axis between the interferometers and the retroreflectors for the determination of the position of the object.

The publication US-Z.: *Quality*, April 1998, p. 20 ff contains the proposal of measuring structures of an object by means of a feeler element by determining its position with an optical sensor. Here it is important that the feeler is sharply imaged.

It is known from the publication US-Z.: *American Machinist*, April 1994, p. 29–32, to use various measuring systems for the determination of the geometry of a workpiece. In this case it relates to the possibility, one the one hand, of measuring a surface with a video camera, and on the other hand, of performing a tactile measurement, these being treated as alternatives.

In US-Z.: *Tooling & Production*, October 1990. p 76–78, a feeler is used optionally for purely tactile, i.e. mechanical measurement and for optical measurement to determine structures. In this case, the feeler contacting the body must also be clearly optically imaged at all times.

A corresponding mechanical-feeler coordinate measuring instrument is shown for example in German Patent 43 27 250 A1. Here a visual check of the mechanically sensing process can be made with the aid of a monitor by observation of the feeler head using a video camera. This feeler head can if necessary be designed in the form of a so-called oscillating crystal feeler that is cushioned upon contact with the workpiece surface. The video camera therefore permits bracing and control on the monitor of the position of the feeler ball relative to the workpiece or to the hole therein which is being measured. The measurement proper is conducted electromechanically, so that the above drawbacks remain valid.

An optical observation of a feeler head in a coordinate measuring instrument is also shown in German Patent 35 02 388 A1.

To determine the precise position of the machine axes of a coordinate measuring instrument, at least six sensors are attached on a sleeve and/or to a measuring head in accordance with German Patent 43 12 579 A1, for enabling the distance from a reference surface to be determined. The sensing of the object geometries is not dealt with in detail here, instead a proximity-type process as a substitute for the classic incremental path measurement systems is described.

U.S. Pat. No. 4,972,597 describes a coordinate measuring instrument with one feeler, of which the feeler extension is pretensioned in its position by a spring. A feeler extension section passing inside the housing has two light-emitting elements located at a distance from one another for determining by means of a sensor element the position of the feeler extension, and hence indirectly that of a feeler element arranged on the outer end of the feeler extension. The optical system here also replaces the classic path measurement systems of electromechanical feeler systems. The sensing process proper is again achieved by force transmission from the feeler element to the feeler pin via spring elements to the sensor. The aforementioned problems with bending and sensing force remain here too. This method is indirect.

To measure large objects such as aircraft components, feeler pins with light sources or reflecting targets are known, the positions of which are optically measured (German Patents 36 29 689 A1, 26 05 772 A1, and 40 02 043 C2). The feelers themselves are moved manually or by using robotics along the surface of the body to be measured.

With this method, the position of the feeler element is stereoscopically determined in its position by triangulation or similar means. The resolution of the overall measurement system is hence directly limited by the sensor resolution. The use of such systems is therefore possible only in the case of relatively low requirements as regards the relationship of measurement area and accuracy. In practice their use is limited to the measurement of large parts.

Aiming at the position of the feeler element using a microscope is also known. In this case, the transmitted-light method is used, so that only structures such as all-through holes or similar can be measured in respect of their diameters. In view of the visual evaluation in the microscope and the separate arrangement of feeler element and optical observation system, neither measurement of more complex structures (distances in complex geometries, angles etc.) nor automatic measurement is possible. Systems of this type are as a result highly prone to faults and are therefore not offered on the market.

SUMMARY OF THE INVENTION

The problem underlying the present invention is to develop a method and a coordinate measuring instrument of the type mentioned at the outset such that any structures can be determined with a high degree of measurement accuracy, with the aim of precisely determining the position of the feeler element to be brought into contact with the object. In particular, it should be possible to measure out bores, holes, undercuts or similar, and to determine structures in the range between 50 and 100 µm with a measuring accuracy of at least ±0.5 µm.

The publication US-Z.: *Plastics World*, August 1989, No. 8, includes an illustration of a feeler element whose position is optically measured. As this illustration makes clear, a feeler is used that does not permit measurement of very small dimensions or of materials that are very soft and hence must not be subjected to high sensing forces, as otherwise a falsification of the geometry would result. An appropriate disclosure is also made in US-Z.: *Quality*, January, 1990, as the illustration makes clear.

A bore measuring microscope is known from the publication of Carl Zeiss Jena, *Technische Messgerate*, p. 54 and 55. In this teaching only the distance between two diametrically opposite points of a bore to be measured is determined under microscopic observation using the transmitted light method.

The problem is solved in accordance with the invention substantially in that the feeler element is connected via an elastic-to-bending shaft as the feeler extension to the coordinate measuring instrument, in that the position of the feeler element or of a target extending from the elastic-to-bending shaft and directly assigned to the feeler element is directly determined with an optical sensor. For measurement of the structure of the object using the optical sensor, certain coordinates of the feeler element or of the target are linked with those of the coordinate measuring instrument, with the position being determined in the transmitted light or reflected light method and/or by self emission of the feeler element or target. Here the feeler element and/or the at least one target is moved from the area of the optical sensor into the position to be measured. In other words, the feeler is moved towards the object from its side facing towards the sensor. The feeler and sensor are here adjustable as a unit inside a coordinate measuring instrument and their joint position can be measured with high precision. This is followed by a linked movement that ensures relatively low uncertainty in the results. Here the position in particular of the feeler element and/or of the at least one target is determined using the sensor by means of light beams reflecting from and/or penetrating the object and/or emanating from the feeler element or target.

In accordance with the invention, the position of the feeler element resulting from contact with the object is determined optically, in order to measure the shape of a structure directly from the position of the feeler element itself or of a target. Here the deflection of the feeler element can be measured by displacement of the image on a sensor field of an electronic image-processing system using an electronic camera. It is also possible to determine the deflection of the feeler element by evaluation of a contrast function of the image. A further possibility for ascertaining the deflection is to determine it from a size change of the target image, from which results the geometrical-optical correlation between object distance and enlargement. Also, the deflection of the feeler element can be determined by the apparent target size change resulting from the loss of contrast due to defocusing. As a general principle, the deflection vertical to the optical axis of the electronic camera is determined here. Alternatively, the position of the feeler element or of the at least one target assigned thereto can be determined by means of a photogrammetric system. If several targets are present, their position can be optically measured and then the position of the feeler element computed, as there is a clear and firm correlation between this and the targets.

In accordance with the invention, and in a divergence from the previous prior art, indirect measurement of the position of the feeler element or of the target assigned thereto takes place in order to determine the structure of an object. Here the feeler element and the target have a clear spatial correlation to the extent that a relative movement to one another does not take place, i.e. short spacings are maintained. It is immaterial here whether the feeler extension from which the target or feeler element extends is deformed during the measuring process, since the feeler element or the target is not indirectly measured, as in the prior art, but directly. With the method in accordance with the invention, holes, bores, depressions, undercuts or other structures with an extent in the range of at least 50–100 µm can be measured with an accuracy of at least ±0.5 µm. This enables three-dimensional measurements of very small structures to be performed, a requirement which has long been felt for example in medical technology for minimally invasive surgery, in microsensor systems, or in automotive engineering to the extent that injection nozzles, for example, are concerned, but which has not yet been satisfactorily solved. Thanks to the direct measurement of the feeler element position or of the target clearly assigned and not movable relative thereto, a direct mechanical/optical measuring method using a coordinate measuring instrument is provided that operates with high precision and does not lead to falsifications of measuring results even if the feeler extension becomes deformed during the measuring process.

A coordinate measuring instrument of the type mentioned at the outset is characterized in that the feeler extension is designed to be elastic to bending. The feeler element and/or the at least one target can here be designed self-radiating and/or as a reflector.

The feeler element and/or the target should preferably be designed as a body such as a ball or cylinder spatially emitting or reflecting a beam.

In accordance with the invention, the feeler element is connected to a feeler extension such as a shaft that is designed to be elastic to bending. This connection can be made by gluing, welding or by any other suitable type of fastening. The feeler element and/or the target can also be a section of the feeler extension itself. In particular, the feeler extension or the shaft is designed as or incorporates a light guide via which the necessary light is supplied to the feeler element or to the target. The shaft itself can be designed as a feeler at its end or can incorporate a feeler. In particular, the feeler element and/or the target should be interchangeably connected to the feeler extension such as a shaft.

In order to determine almost any structure, it is furthermore provided that the feeler extends from a holder adjustable in five degrees of freedom. The holder itself can in turn form a unit with the sensor or be connected to the sensor.

It is also possible for the feeler element and/or the target to be designed as or to incorporate a self-lighting electronic element such as an LED.

In accordance with the invention, a feeler system for coordinate measuring instruments is proposed that combines the advantages of optical and mechanical feeler systems, and which can be used in particular for the mechanical measurement of very small structures where conventional feeler systems can no longer be employed. However, simple attachment and changing of optical measuring instruments for mechanical measuring tasks is also possible as a result.

For example, it is provided that a feeler element or sensing element or a target assigned thereto can be determined in its position by a sensor such as an electronic camera once the former has been brought into mechanical contact with a workpiece. Since the position of either the feeler element itself or the target connected directly to the feeler element is measured, deformations of a shaft receiving the feeler have no effect on the measuring signal. In the measurement, it is not necessary for the elastic behavior of the shaft to be taken into consideration, and plastic deformations, hystereses and drift effects of the mechanical connection between the feeler element and the sensor cannot impair measurement accuracy. Deflections in the direction vertical to the sensor axis such as the camera axis can be determined directly by displacement of the image in a sensor field in particular of an electronic camera. The evaluation of the image can be performed with an image-processing system already installed in a coordinate measuring instrument. This provides a two-dimensionally operating feeler system which can be easily connected to an optical evaluation unit.

For sensing the deflection in the direction of the optical system axis such as a camera axis, there are several possibilities in accordance with the invention, for example:

1. The deflection of the feeler element in the direction of the sensor axis (camera axis)is measured by a focus system as already known in optical coordinate measurement technology for focusing on workpiece surfaces. Here the contrast function of the image is evaluated in the electronic camera.

2. The deflection of the feeler element in the direction of the sensor axis or camera axis is measured by the imaging size of a target being evaluated, e.g. in the case of a circular or annular target the change in the diameter. This effect is the result of the geometrical-optical imaging and can be selectively optimized by the design of the optical unit. In coordinate measurement technology, so-called telecentric lenses are frequently used and are intended to achieve a largely constant enlargement even in the event of deviation from the focal plane. This is achieved by moving the optical entry pupil into "infinity". For the evaluation as described above, an optimization the other way round would be useful: even a minor deviation from the focal plane should result in a clear change of the imaging scale. This is achieved by for example moving the optical entry pupil to the level of the focal point on the object side. If possible a high depth of field should be achieved to permit high-contrast imaging of the target over a relatively wide distance range. An ideal optical unit as regards its imaging properties for the application described above would be for example a pin camera. By the use of an annular target, size changes resulting from lack of focus can be minimized: it is not the mean ring diameter that changes due to lack of focus in the first approach, but only the ring width.

3. In a third option too, the size change of the target is evaluated, however this change results from the combination of geometrical-optical size change and the apparent enlargement by out-of-focus edges. In comparison with the evaluation of the lack of focus function, this method takes advantage of the fact that the actual size of the target is invariable.

In accordance with the invention, direct measurement of a feeler element position is used for determining the structures of objects. Generally speaking, many different physical principles are usable for the direct measurement. Since the measurement of the feeler element deflection in a very large measurement range in the spatial sense must be very precise, for example to permit continuous scanning operations, and to allow for a large excess stroke during object sensing (e.g. for safety reasons, but also to reduce the effort needed for precise positioning), a photogrammetric method can also be used. Two camera systems with axes oblique to one another can be used. In general the evaluation techniques known from industrial photogrammetry can be used.

With two cameras "looking" for example obliquely toward the longitudinal direction of the feeler element or to the ends facing said feeler element of a feeler extension such as a shaft, all measuring tasks can be performed in which the feeler element does not "disappear" behind undercuts. The use of a redundant number of cameras (e.g. three) permits measurement of objects with steep contours too. For measurement in small bores, a camera can be used that is arranged such that it is "looking" onto the feeler element in the longitudinal direction of the feeler element or feeler extension. As a general principle, a single camera aligned with the longitudinal direction of the feeler extension such as shaft holding the feeler element is sufficient in the case of two-dimensional measurements (e.g. for measurements in bores).

For the use of the feeler in accordance with the invention, an actively light-emitting feeler element or other active target is not essential. Particularly high accuracies can be achieved with light-emitting feeler balls or other light-emitting targets on the feeler extension. The light from one light source is here supplied to the feeler element such as ball or to other targets of the feeler extension for example via a light guide fiber which can itself be the feeler shaft or feeler extension. The light too can be generated inside the shaft or in the targets if these contain LEDs, for example. The reason for these designs is that electronic image systems such as photogrammetric systems, in particular those for microscopically small structures, require a high light intensity. If this light is directly supplied to the feeler element in targeted form, the necessary light intensity can be reduced considerably, and hence also the thermal load on the object during the measurement. If a ball is used for the feeler element, the result is an ideally high-contrast and ideally circular image of the feeler ball from every direction viewed. This applies in particular in the use of a volume-dispersing ball. Errors from imaging of structures of the object itself are avoided, since the object itself is only brightly illuminated in the immediate vicinity of the feeler ball. Here however the feeler ball image resulting from reflections on the object in practice always appears less bright than the feeler ball itself As a result, errors can be corrected without difficulty.

Externally illuminated targets do not necessary have these advantages. It is also possible to design the targets fluorescent, so that incoming and outgoing light is separated in terms of frequency, and hence the targets too can be more clearly isolated from their surroundings in the image. The same considerations apply for the feeler element itself.

To measure in small bores or on very steep structures too, when the feeler element cannot be measured itself or not measured by several cameras due to shading, the position, the orientation and the curvatures of the light guide fiber in the visible part-areas can be measured in accordance with the invention by sensors or by photogrammetry. From this the position of the feeler element can be calculated, e.g. by applying the fiber curvature in the form of a parabola with linear or square term. The measurement with different excess strokes (more or less positioned into the object) and then taking the mean of the feeler element position increases measuring precision. Both optical and photogrametric measurement of the fiber is facilitated by a steady light emission of the fiber, which can be improved by the use of volume-dispersing fiber material, the application of a diffusely emitting layer on the fiber surface or another suitable selection of fiber composition and fiber geometry (e.g. production using material with relatively low refractive index).

It is also possible in accordance with the invention to attach further illuminated balls or other targets on the light guide fiber, to measure the position of these targets by photogrammetry in particular, and to calculate the position of the feeler element accordingly. Balls are here relatively speaking ideal and clear targets that are not otherwise present on the fiber. A good light incidence into the balls is achieved by disrupting the light guidance properties of the shaft, for example by mounting the volume-dispersing balls with through-holes onto the shaft, i.e. the feeler extension, and gluing them there. The volume-dispersing balls can also be affixed to the side of the shaft, which also permits light incidence, provided that the shaft carries light up to its surface, i.e. does not have a sheath at the fastening point. A particularly high accuracy is achieved when the feeler element position is experimentally measured (calibrated) as a function of the fiber position and fiber curvature (zones of fibers at some distance from feeler element). Here too the measurement of targets attached along the fiber is possible instead of measurement of the fiber itself Calibration can for example be achieved by sensing a ball from different directions and with different forces (more or less "positioned into" the object), or by a known relative positioning of the feeler system relative to the clamped feeler ball.

The separation of the feeler element, such as feeler ball, and targets additionally reduces the possibility of disruption of the feeler element position measurement by reflections of the targets on the object surface.

In accordance with the invention, several feelers can be in use consecutively; for example, various feeler elements or feeler pins can be rotated into view with a simple changing unit (e.g. turret with several feelers). It is also possible in accordance with the invention for several feeler elements to be in operation at the same time. The active feeler element or feeler pin can for example be identified by switching off the lights of the non-active feeler pins or by other coding means such as target size, light color, target position in feeler coordinate system, modulation of the light and/or using attached models. Feeler pin measurements as standard in classic coordinate measurement technology are no longer essential in the feelers in accordance with the invention, since the feeler ball position and the feeler ball diameter can be measured with often sufficient precision by photogrammetric means.

Measurement with small feeler elements often entails a large number of destroyed feeler pins (feeler element, feeler extension). With the system in accordance with the invention, the feeler pins are inexpensive and easy to replace. Expensive sensors and the movement axes are generally not damaged or altered by collisions, since the distance from the feeler element can be quite large. For example, the shaft length can be greater than the movement range of the system, so a collision is not possible. A large feeler or ball deflection relative to the shaft length is possible without difficulty. The result is a high inherent safety of the system and good scannability. Also, high sensing speeds are possible without damaging the object surface.

Photogrammetric systems, or other known optically operating sensor systems, permit mathematical alignment of the object before the actual start of measurement thanks to the image information from the lens. This permits accurate sensing of the object in the actual tactile measurement.

There are in this system two types of elastic influences that can lead to measurement deviations:

1. The resilience of the object itself (in large ranges); influences from this can be extrapolated to zero by measurement with at least two sensing forces; and,
2. The local resilience from Hertzian stress between ball and object surface; these effects can if required (i.e. for high-precision measurement or for resilient objects) be eliminated by a measurement with at least two different sensing forces and extrapolation to the fictitious sensing force "zero".

The extrapolation to the force "zero" in the second ease is possible since the deformation according to Hertz is equal to a constant multiplied with the (sensing force)$^{2/3}$ $$D = K \times F^{2/3}$$

where:

D is deformation at the point of contact between object and feeler ball;

F is force (or a quantity proportional to the sensing force); and

K is constant.

$D_1 = K \times F_1^{2/3}$ $D_2 = K \times F_2^{2/3}$ $D_1 - D_2 = K \times (F_1^{2/3} - F_2^{2/3})$ From the above is derived the value of K when the difference ($D_1 - D_2$) is known from the measurement and when $F_1$ and $F_2$ are known. It is now possible to calculate the deformations $D_1 - D_2$ in relation to sensing with "zero" force. The force-proportional values are for example the movement distances calculated starting from the first object contact.

Alternatively, these can also be measured with force sensors. A force sensor for example can be the fiber itself if its curvature is photogrammetrically measured or on the basis of changes in the light reflected/diffused back internally to the light source or in the emitted light. It is best to perform the measurement with several sensing forces for all high-precision measuring tasks, since the effective radii in the contact point between the object and the feeler element can vary greatly due to local waviness and roughness features.

If the Hertzian and the linear resilience are of the same order of magnitude, sensing with at least three forces is necessary, and both the linear and the Hertzian resilience constant must be determined in order to extrapolate to the fictitious "zero" force.

If the divergences from the ideal spherical form in small balls used as feelers are not negligible, with diameters of less than 0.1 m, a direction-dependent correction of the sensing point coordinates may be necessary. To measure the correction values, two methods are possible:

1. measurement of the deviations of the feeler element from the spherical form, performed independently of the feeler system with special measuring instruments; and
2. measurement of the deviations of the feeler element from the spherical form, performed by measurement of a reference ball with the feeler system itself.

As a general principle, it is also possible to select a different geometry form for the feeler elements than that of a ball, e.g. a cylinder, which can represent the fiber itself or the rounded end of the fiber itself as the feeler extension.

Since the feeler element (e.g. a ball) is more or less completely imaged depending on the direction of observation, and since dirt too has a very disruptive effect, it is best to determine the position of the feeler element with so-called robust compensation algorithms. These include for example the minimization of the sum of deviation amounts (so-called L1 standard).

Correction methods set forth above are however only necessary in extreme cases, without the teachings in accordance with the invention being generally affected as a result.

Generally speaking, the illumination of the feeler element, the targets or the shaft can be not only from the inside through the shaft, but also from the outside using suitable illumination devices.

One variant that is possible here is for the feeler element or targets to be retro-reflectors (triple reflectors, cat's eyes, reflecting balls) that are externally illuminated from the camera viewing angle.

The feeler in accordance with the invention is generally not itself restricted to certain sizes of the measurement objects and feeler element itself. It can be used for measurement of single-dimensional, two-dimensional or three-dimensional structures. In particular the feeler extension can be designed as a light guide and have a diameter of 20 $\mu$m. The diameter of the feeler element such as feeler ball should then be preferably 50 $\mu$m. In particular, it is provided that the diameter of the feeler element is about 1 to 3 times greater than that of the feeler extension.

To increase the fracture strength of the feeler extension when light guides are used, the latter can have a surface coating such as Teflon or another fracture-inhibiting substance. Sheathing can be applied by sputtering, for example.

The spatial position of the feeler element can be determined using a two-dimensional measuring system when the feeler element has at least three targets assigned to it, the images of which are evaluated for determining the spatial position of the feeler element.

The invention also permits a scanning method for determining workpiece geometries. In particular, the images to be evaluated can be generated by a position-sensitive surface sensor.

Compared with purely mechanically measuring feeler systems, the teachings in accordance with the invention have the following advantages, among others:

Elastic and plastic influences and creepage effects of the mechanical holder and the sensing shaft do not affect the measuring result.

Very low sensing forces (>1 N) can be attained.

No precision mechanics are necessary.

Very small feeler elements and shaft diameters can be used.

The positioning of the feeler system can be optimally monitored by the operator using the optical system.

The systems can be directly attached to the existing optical system of a coordinate measuring instrument and the image signal evaluated using an existing image processor.

Low equipment expenditure thanks to adaptation to existing optical coordinate measuring instruments.

Compared with purely optically measuring feeler systems, the advantages are as follows:

The actual mechanical quantities are measured. Surface properties such as color and reflection characteristics do not affect the measurement result;

Measurements can be made on three-dimensional structures not accessible for purely optical systems. For example, the diameter and the form divergence of a bore can be measured at different height sections.

BRIEF DESCRIPTION OF THE DRAWINGS

Further details, advantages and features of the invention are not only shown in the claims and in the features they contain, singly and/or in combination, but also in the following description of preferred embodiments shown in the drawings.

Figure 3:
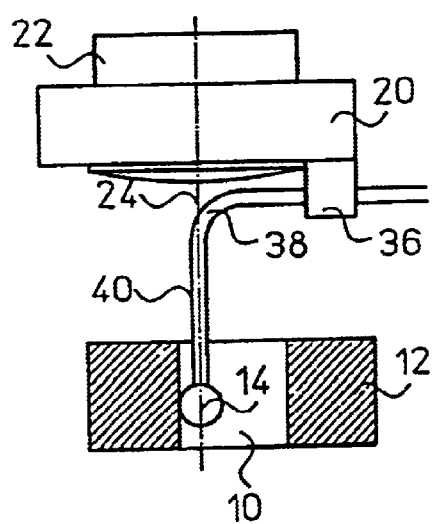

IN THE DRAWINGS,

FIG. 1 shows an embodiment of an array for measurement of structures of an object.

FIG. 2 shows a second embodiment of an array for measurement of structures of an object.

FIG. 3 shows a third embodiment of an array for measurement of structures of an object.

Figure 4:
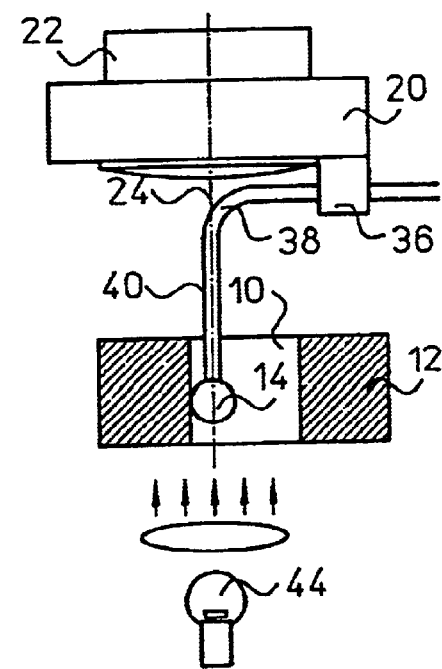

FIG. 4 shows a fourth embodiment of an array for measurement of structures of an object.

FIG. 5 shows a fifth embodiment of an array for measurement of structures of an object.

FIG. 6 shows a sixth embodiment of an array for measurement of structures of an object.

Figure 7:
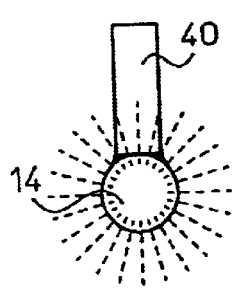

FIG. 7 shows a section through a first embodiment of a feeler.

Figure 8:
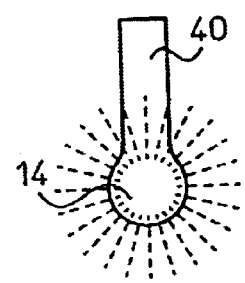

FIG. 8 shows a section through a second embodiment of a feeler.

Figure 9:
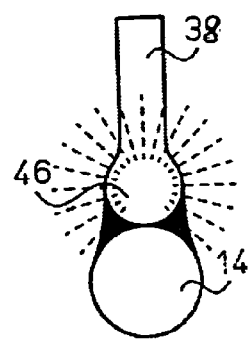

FIG. 9 shows a section through a third embodiment of a feeler.

Figure 10:
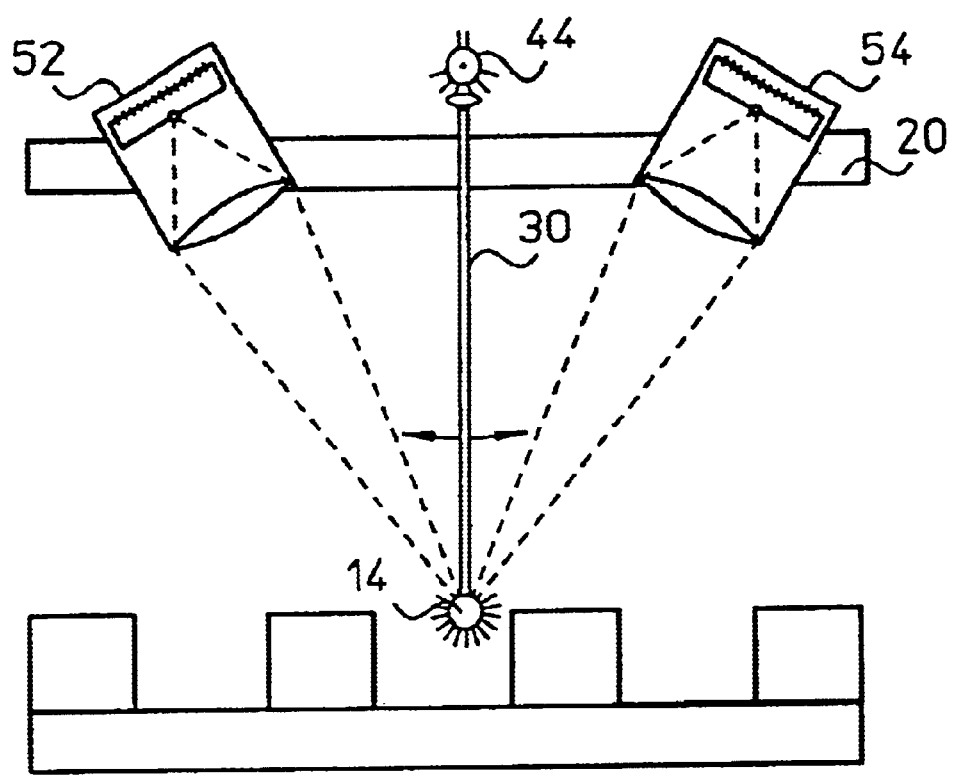

FIG. 10 shows a seventh embodiment of an array for measurement of structures of an object.

Figure 11:
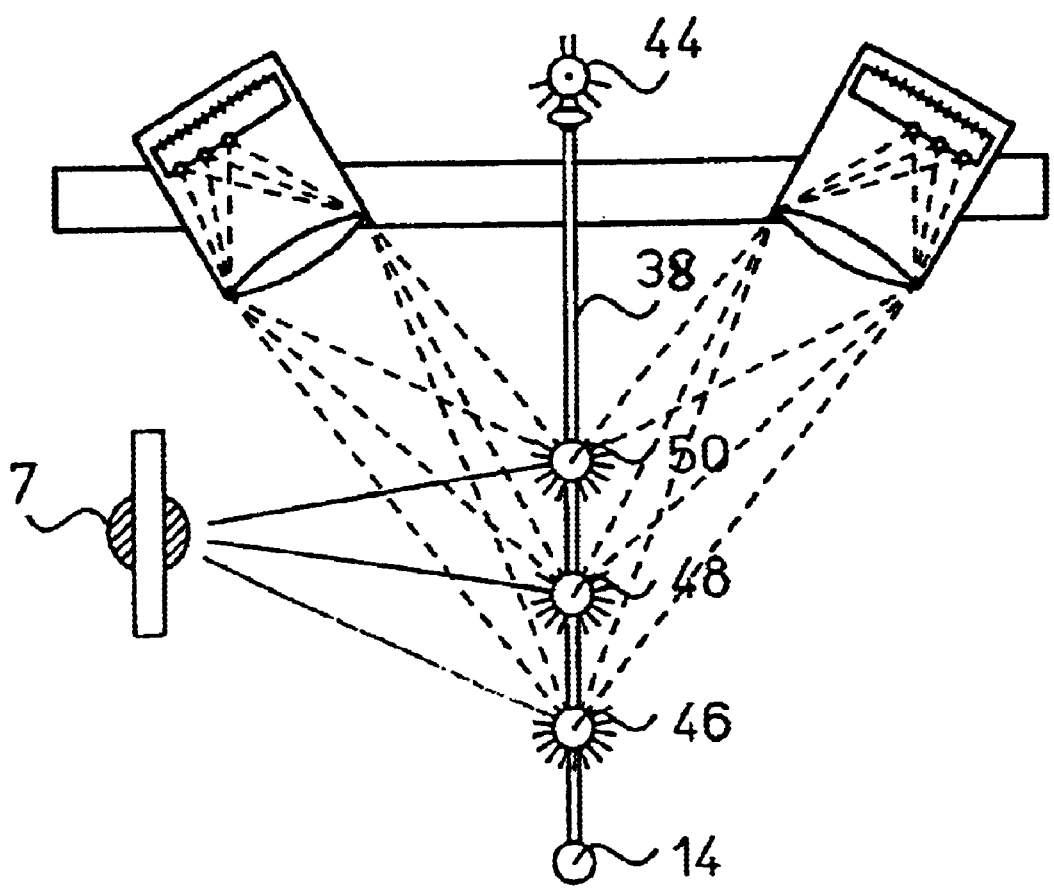
Figure 12:
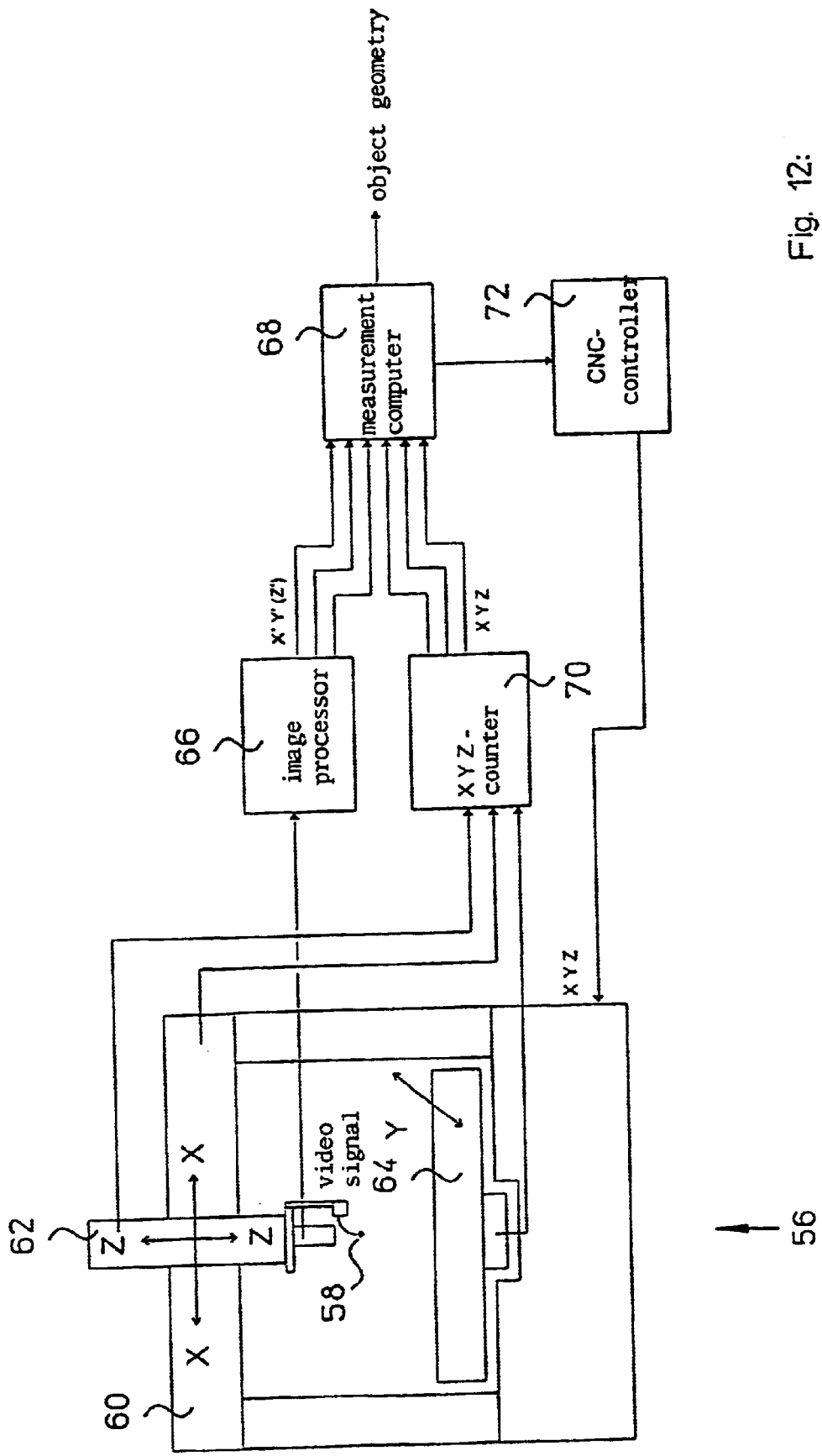

FIG. 11 shows an eighth embodiment of an array for measurement of structures of an object, and FIG. 12 shows a block diagram.

PREFERRED EMBODIMENTS OF THE INVENTION

In the figures, in which identical elements are referred to by the same reference characters, various embodiments of arrays for the measurement of structures of an object are shown in principle by means of a feeler assigned to a coordinate measuring instrument. As an embodiment, the structure of a bore 10 in an object 12 is to be determined. The edge of the bore 10 is sensed by a feeler element 14 which in turn extends from a feeler extension 16 and forms with the latter a feeler 18.

The feeler 18 extends from a holder 20 that is adjustable by at least three degrees of freedom, preferably five. An optical system of a coordinate measuring instrument 22 is preferably mounted on the holder 20 itself. A different type of connection is also possible. It is however crucial that the optical system or a sensor of the coordinate measuring instrument 22 is adjustable as a unit with the feeler element 14 in the X, Y and Z directions. Regardless of this, an adjustment of the feeler element 14 relative to the optical axis 24 and to the focal plane takes place. There are various possibilities for positioning the feeler element 14, i.e. in one embodiment a feeler ball in the intersection of the optical axis 24 with the focal plane. It is therefore possible in accordance with the embodiment in FIG. 1 for the feeler extension 16 to be inserted laterally from the holder 20 into the optical axis 24.

In the embodiment in FIG. 2, fastening arms 26, 28 extend from the holder 20, end outside the focal plane and are used as a receptacle for a feeler extension 16 inserted laterally into the optical axis 24, said feeler extension being connectable by a coupling piece 30 to the feeler element 32 which, via a rod-like section 34 passing along the optical axis 24, merges into the feeler element 14 proper in the form of a ball, using which the structure of the edge of the hole 10 is determined.

In the array according to FIG. 3, an L-shaped curved feeler extension 38 is held by a receptacle 36 extending from the holder 20, with a straight-lined end section 40 of the feeler extension 38 running parallel to the optical axis 24 and merging at the end into the feeler element such as feeler ball 14.

Once the feeler element 14 has been adjusted, it can be observed through the existing optical system of the coordinate measuring instrument 22 or an appropriate sensor. When the edge of the bore 10 is sensed, the feeler element 14 changes its position in the camera or sensor field. This deflection is evaluated by an electronic image-processing system. This achieves a mode of operation with a similar effect to a conventionally measuring feeler system. The coordinate measuring instrument 22 can here be controlled in the same way as a conventional mechanically measuring feeler system.

There are various possibilities for optical measuring of the feeler element 14, and these are shown in principle in FIGS. 4 to 6 and 10 and 11.

In FIG. 4, for example, a transmitted-light method is proposed, where the shadow of the feeler element 14 on the sensor or camera field is viewed or measured. It is essential for the transmitted-light method as shown in FIG. 4, however, that the workpiece 12 is passed through completely.

In the embodiment in FIG. 5, the feeler element 14 is subjected to light by reflecting in the light along the optical axis 24. To that end, there is a mirror 42 above the coordinate measuring instrument 22 via which light is reflected in through the coordinate measuring instrument 22 and the holder 20 along the optical axis 24.

A light guide fiber is preferably used for the feeler extension 38. This has the advantage that the light is passed through it to the feeler element 14, as shown in FIG. 6. The light source itself is numbered 44 in the Figure.

The feeler element 14 has in the embodiments a volume-emitting ball form, The feeler element 14 here can be firmly connected to the feeler extension 38 for example by gluing or welding. However an interchangeable connection using a coupling is also possible.

While in the embodiment in FIG. 7 the feeler element 14 is glued to the end 40 of the feeler extension 38, in the embodiment in FIG. 8 the feeler element 14, i.e. its end section 40, is itself designed as the feeler element. To that end, the end section 40 is appropriately shaped at its end. It is however also possible to provide the end face of the feeler extension 38 with a reflecting cover in order to fulfill the function of the target.

Instead of observation of the feeler element 14 itself, a preferably spherical target 46 can be assigned to it in a fixed location, and is a section of the feeler extension 38 or is mounted thereon, as made clear in FIG. 11. The feeler extension 38 therefore has at its end the spherical feeler element 14. Furthermore, spherical targets 46, 48, 50 are provided at intervals from one another on the feeler extension 38. As a result, it is possible to observe either the position of the feeler element 14 directly or the targets 46 or 46, 48 or 46, 48, 50 clearly assigned to it.

The feeler element 14 or the target 46, 48, 50 can be formed of various materials such as ceramics, ruby or glass. In addition, the optical quality of the appropriate elements can be improved by the application of coatings of diffusing or reflecting layers.

The diameter of the feeler extension 38 is preferably less than 100 $\mu$m, and preferably 20 $\mu$m. The feeler element 14 or the target 46, 48, 50 has a greater diameter, preferably one between 1.5 and 3 times larger than that of the feeler extension 38 such as the light guide.

In the area where the sheath of the feeler extension 38 does not have to be traversed by light, a surface coating of Teflon or another fracture-inhibiting substance can be provided. The image of the feeler element 14 or of a target 46, 48, 50 assigned thereto can be displayed on, for example, a CCD field of an optical coordinate measuring machine. The displacement of the light dot in the CCD field can be measured with subpixel precision. With the method in accordance with the invention, reproducible measurements with a precision in the $\mu$m range are possible.

In the embodiment in FIGS. 10 and 11, a photogrammetric method is used: two optical imaging systems such as cameras 52, 54 aligned with the feeler element 14 extend from a common holder 20. The cameras 52, 54 optically aligned with the feeler element 14 permit a spatial determination of the feeler element 14 using conventional evaluation techniques known from industrial photogrammetry. The use of a redundant number of cameras (for example three) also permits measurement of an object when one of the three cameras is shaded. For small bores, the use of one camera is sufficient, and in this way is optically aligned on the feeler element 14. Independently of this, either an actively light-emitting, light-reflecting or light-shading feeler element 14 or a target 46, 48, 50 is used to determine the structure in the object, with light being supplied from the light source 44 to the feeler element 14 or to the targets 46, 48, 50 via the feeler extension 38 designed as light guide fiber. Alternatively, it is possible to generate the light itself in the feeler extension 38, or in the targets 46, 48, 50 or feeler element 14 by these being or containing electrically illuminated modules such as LEDs, for example. With the teachings in accordance with the invention, an ideally high-contrast image and an ideally circular image of the feeler element 14 or of the targets 46, 48, 50 are obtained, provided the latter are of spherical form. Additionally or alternatively, it is possible to design the feeler element 14 or the targets 46, 48, 50 fluorescent, so that incoming and outgoing light are separated in frequency such that the image generated by the feeler element 14 or the targets 46, 48, 50 can be separated from its surroundings.

With the design in accordance with the invention of a coordinate measuring instrument using which a feeler element such as a feeler ball or a target clearly assigned thereto spatially is directly measured optically, in order to determine the structure of the body from this direct optical measurement of the feeler element or target, structures in the order of magnitude of 100 µm and less, in particular in the range up to 50 m, can be determined with a measurement uncertainty of ±0.5 µm. With the coordinate measuring instrument, standard measurement volumes of, for example, 0.5×0.5×0.5 m³ can be measured.

FIG. 12 shows a block diagram in order to determine, in line with the teachings in accordance with the invention, the structure of an object in a coordinate measuring instrument 56 by direct optical measurement of the position of a feeler element 58, where the object is to be sensed by the feeler element 58 using CNC control.

The coordinate measuring instrument 56 is of standard design. For example the feeler element 58 extends from a holder attached to a sleeve 62 adjustable in the X direction along a crosspiece 60, which in turn is adjustable in the Z direction. The object itself is fastened to a measurement table 64 movable in the Y direction. When the feeler element 58 senses the object, the coordinates $X^1$, $y^1$ and $Z^1$ of the feeler element 58 are calculated from the video signals corresponding to the position of the feeler element 58 by an image-processor 66, and then fed to a measurement computer 68 and there linked to the coordinate values X, Y, Z of the coordinate measuring instrument 56, which are determined using a counter 70. From the values computed in this way, on the one hand the object geometry is determined and on the other hand the CNC operation of the coordinate measuring instrument 56 is controlled using a CNC control 72.

What is claimed is:

1. A method for measuring the structure of an object by means of a flexible feeler means that is operatively connected to a coordinate measuring instrument, wherein the feeler means is brought into contact with the object and the position of the feeler means is then determined, the feeler means comprising a mechanically flexible and deflectable feeler extension, wherein said feeler extension is deflectable due to its inherent flexibility, the position of the feeler extension, or of a target extending from the feeler extension and operatively connected to the feeler extension is directly determined with an optical sensor, and wherein certain coordinates of the feeler extension or of the target are linked with those of the coordinate measuring instrument for measuring the structure of the object, using the optical sensor.

2. Method according to claim 1, wherein the feeler extension or the target is moved towards the object from its side facing towards the sensor.

3. Method according to claim 1, wherein the feeler extension is adjusted with the sensor as a unit.

4. Method according to claim 1, wherein a deflection of the feeler extension resulting from the contact with the object is optically determined.

5. Method according to claim 4, wherein the deflection of the feeler extension is measured by displacement of its image or of an image of a target on a sensor field.

6. Method according to claim 4, wherein the deflection of the feeler extension is determined by evaluating the contrast of the feeler sensed by the optical sensor.

7. Method according to claim 4, wherein the deflection of the feeler extension is determined from a size change of an image of a target resulting from the geometrical-optical correlation between object distance and enlargement.

8. Method according to claim 4, wherein the deflection of the feeler extension is determined from apparent size change of a target resulting from loss of contrast due to defocusing.

9. Method according to claim 4, wherein the deflection vertical to an optical axis of an electronic image-processing system is determined.

10. Method according to claim 1, wherein the spatial position of the feeler extension is determined using a two-dimensional measurement system by means of at least three targets assigned thereto.

11. Method according to claim 1, wherein the feeler extension or a section thereof is used as a spatially extended target whose position is measured relative to the feeler body in freely selectable cross-sections.

12. Method according to claim 1, wherein targets arranged on the feeler extension for determining the position of the feeler means are measured by photogrammetry (at least two cameras).

13. Method according to claim 1, wherein the position of the feeler extension is measured by photogrammetry (at least two cameras).

14. A coordinate measuring machine for measuring the structure of an object, the machine comprising a support table arranged on the X-Y axes of the measuring machine for supporting the object, a holding device adjustable in the X-Y-Z axes of the measuring machine, feeler means including a mechanically flexible and deflectable feeler extension, wherein said feeler extension is deflectable due to its inherent flexibility, said feeler extension having a contact tip at its end and being operatively connected to said holding device, an optical sensor for determining the location of said contact tip or a target directly associated with said contact tip, and a measurement computer for calculating the structure of the object based on the position of the contact tip or the target.

15. Coordinate measuring instrument according to claim 14 wherein the contact tip (14) or the target (46, 48, 50) is designed as a reflector.

16. Coordinate measuring instrument according to claim 14, wherein the contact tip (14) or the target (46, 48, 50) is designed self-emitting.

17. Coordinate measuring instrument according to claim 14, wherein the contact tip (14) or the target (46, 48, 50) is a ball or cylinder spatially emitting or reflecting a beam.

18. Coordinate measuring instrument according to claim 14, wherein the contact tip extension (38) is designed at least in some sections elastic to bending or as a light guide or comprising a light guide.

19. Coordinate measuring instrument according to claim 14, wherein the feeler extension (38, 40) or at least a section thereof is the feeler element (14) or the target (46, 48).

20. Coordinate measuring instrument according to claim 14, wherein several targets (46, 48) are assigned to the contact tip (14) and extend preferably from the feeler extension (30) or form sections thereof.

21. Coordinate measuring instrument according to claim 14, wherein the feeler extension (30) is designed L-shaped for alignment with an optical axis (24).

22. Coordinate measuring instrument according to claim 14, wherein the feeler extension (30) is designed at the end as a feeler element (14).

23. Coordinate measuring instrument according to claim 14, wherein the contact tip (14) or the target (46, 48, 50) are interchangeably connected to the feeler extension (30).

24. Coordinate measuring instrument according to claim 14, wherein the contact tip (14) or the target (46, 48, 50) are connected to the feeler extension (30) by gluing or welding.

25. Coordinate measuring instrument according to claim 14, wherein the feeler extension (18) extends from a holder

(20) that is adjustable by at least three degrees of freedom, preferably five, and preferably interchangeable.

26. Coordinate measuring instrument according to claim 14, wherein the feeler extension (18) extends from a holder (20) that forms a unit with the sensor or is connected to the sensor.

27. Coordinate measuring instrument according to claim 14, wherein the feeler extension (18) is moved towards the object from its side facing towards the sensor.

28. Coordinate measuring instrument according to claim 14, wherein the contract tip (14) or the target (46, 48, 50) has or is a self-lighting electronic element.

29. Coordinate measuring instrument according to claim 14, wherein the sensor is an image-processing sensor.

30. Coordinate measuring instrument according to claim 14, wherein the sensor is a position-sensitive surface sensor.

31. Coordinate measuring instrument according to claim 14, wherein the diameter of the contact tip (14) is about 1 to 3 times greater than that of the feeler extension (38).

32. Coordinate measuring instrument according to claim 14, wherein the feeler extension (30) has at its end a cylindrical form and is designed as a feeler element (14).

33. Coordinate measuring instrument according to claim 14, wherein the feeler extension (30) is spherically rounded for formation of the feeler element.

* * * * *